(12) United States Patent
Lee et al.

(10) Patent No.: US 8,724,943 B2
(45) Date of Patent: May 13, 2014

(54) ANGLED PHYSICAL CONTACT RECEPTACLE STUB AND ANGLED PHYSICAL CONTACT TRANSMITTER OPTICAL SUB-ASSEMBLY HAVING THE SAME

(75) Inventors: Jong-Hoon Lee, Daejeon-si (KR); Seung-Hyun Cho, Daejeon-si (KR); Jie-Hyun Lee, Daejeon-si (KR); Sang-Soo Lee, Daejeon-si (KR); Eun-Gu Lee, Daejeon-si (KR); Han-Hyub Lee, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 212 days.

(21) Appl. No.: 13/325,029

(22) Filed: Dec. 13, 2011

(65) Prior Publication Data
US 2012/0148191 A1 Jun. 14, 2012

(30) Foreign Application Priority Data
Dec. 14, 2010 (KR) .................. 10-2010-0127743

(51) Int. Cl.
*G02B 6/32* (2006.01)
(52) U.S. Cl.
USPC .................. 385/33; 385/31; 385/32; 385/35; 385/88; 385/93

(58) Field of Classification Search
USPC ........... 385/31–35, 88, 60, 72, 76, 78, 85, 90, 385/92–93
See application file for complete search history.

(56) References Cited

U.S. PATENT DOCUMENTS

| | | | |
|---|---|---|---|
| 7,011,455 B2 | 3/2006 | Luo et al. | |
| 7,665,901 B2 * | 2/2010 | Kewitsch | 385/73 |
| 8,480,310 B2 * | 7/2013 | Kewitsch | 385/73 |
| 2006/0171631 A1 * | 8/2006 | Deng et al. | 385/28 |
| 2006/0269194 A1 * | 11/2006 | Luther et al. | 385/78 |
| 2006/0275001 A1 * | 12/2006 | Nakanishi et al. | 385/93 |
| 2007/0196053 A1 * | 8/2007 | Kewitsch | 385/74 |
| 2008/0019642 A1 * | 1/2008 | Kewitsch | 385/72 |
| 2008/0187272 A1 * | 8/2008 | Sato | 385/93 |
| 2010/0316338 A1 * | 12/2010 | Shono | 385/93 |

\* cited by examiner

*Primary Examiner* — Ryan Lepisto
*Assistant Examiner* — Guy Anderson
(74) *Attorney, Agent, or Firm* — Rabin & Berdo, P.C.

(57) ABSTRACT

An APC receptacle stub and an APC TOSA having the same are provided. The APC receptacle stub includes a first APC stub and a second APC stub. The first APC stub has an optical fiber inserted thereto and is provided with one end section polished in an APC shape. The second APC stub has an optical fiber inserted thereto and is provided with one end section polished in an APC shape and an opposite end section which is coupled to an opposite end section of the first APC stub through rotation adjustment in the same axial direction as an axial direction of the opposite end section of the first APC stub. The APC receptacle stub enables easy optical alignment and is applicable to a light source that is sensitive to reflection.

13 Claims, 4 Drawing Sheets

ANGLED PHYSICAL CONTACT RECEPTACLE STUB AND ANGLED PHYSICAL CONTACT TRANSMITTER OPTICAL SUB-ASSEMBLY HAVING THE SAME

CROSS-REFERENCE TO RELATED APPLICATION

This application claims the benefit under 35 U.S.C. §119 (a) of Korean Patent Application No. 10-2010-0127743, filed on Dec. 14, 2010, the disclosure of which is incorporated by reference in its entirety for all purposes.

BACKGROUND

1. Field

The following description relates to a transmitter optical sub-assembly forming an optical transceiver of an optical communication system, and more particularly, to an angled physical contact receptacle stub and a transmitter optical sub-assembly having the same.

2. Description of the Related Art

An Optical sub-assembly (OSA) is manufactured by use of a cylindrical or box type housing called as a transistor-outlined (TO) CAN. TO CAN is manufactured by attaching a light source chip and a photo diode (PD) chip on a main mount, referred to as a stem, by use of a sub-mount, and then aligning an optical fiber, or an optical fiber stub or an optical fiber ferrule having an optical fiber with the optical source chip through a lens.

In particular, in manufacturing a transmitter Optical Sub-Assembly (TOSA), the coupling efficiency between the light source chip and the optical fiber is highly regarded. Accordingly, the TOSA is manufactured using an Active Alignment in which optical alignment is achieved by applying an electric current on a light source such that the optical coupling is maximized. In this case, the TOSA is manufactured by coupling optical elements, such as a metal housing and a receptacle which supports an optical fiber ferrule, through laser welding. The shape of the OSA is determined by standards of optical transceiver for customization and industrialization, and the OSA is connected to a transmission fiber through standardized input/output optical connectors.

Optical connectors, which have been commercialized and widely used, are classified into a Subscriber Connector or Square Connector (SC), a Fiber Transmission System Connector (FC), a Lucent Connector (LC), a Straight Tip (ST) and a Miniature Unit (MU) based on the external shape, and classified into a Physical Contact (PC) connector and an Angled Physical Contact (APC) connector based on the shape of a polished end section of a fiber ferrule of a connector.

The PC connector is finely classified into a Super Physical Contact (SPC) and a Ultra Physical Contact (UPC) based on the degree of reflection occurring when two connectors are physically coupled to each other. If an air gap exists due to an imperfect coupling between PC end sections, the reflectivity at the end sections is substantially increased. The APC connector has an end section angled with about 6° to 8° to improve the reflection characteristics or return loss, thereby preventing the transmission efficiency from being degraded due to reflection at the end section.

For a colorless light source that is sensitive to reflection, for example, a Reflective Semiconductor Optical Amplifier (RSOA), and a Reflective Electro-Absorption Modulator (REAM), a transceiver is manufactured by use of a fiber pigtail type TOSA having an APC connector. However, in a wavelength division multiplexing-passive optical network (WDM-PON) system, the using of the fiber pigtail type TOSA in an optical transceiver increases the volume of the optical transceiver and lowering the mounting density of a system In addition, the using of the fiber pigtail type TOSA does not satisfy the shape of an optical transceiver that is suggested by standardization organization such as Multi-Source Agreement, increasing the complexity of the system. In addition, an additional device or equipment needs to be installed to accommodate the optical transceiver, thereby increasing the implementation cost when the system is constructed and causing unexpected problems when the system operates. In order to remove the above described drawbacks, there is a need for an APC receptacle TOSA that is applicable to a standardized transceiver.

The manufacturing of an APC receptacle TOSA requires more thorough optical alignment compared to a fiber pigtail TOSA or a PC receptacle TOSA. That is, a fiber receiving end formed at a lower part of a receptacle is generally designed to have an angled facet such that interference caused by near reflection is removed.

In achieving the maximum optical coupling by use of a fiber pigtail TOSA, a rotational alignment is performed such that a position of a beam collected through a lens corresponds to a position where an APC angle optical stub is coupled to a housing and a direction of the beam corresponds to an angle direction of $\Phi$ with respect to an axis of light propagation.

In achieving the maximum optical coupling by use of PC receptacle TOSA, different from the fiber pigtail TOSA, the PC receptacle is subject to alignment such that beam is collected in the center of an upper part of a housing to maintain a uniform shape. In this case, the fiber transmitting end, which is coupled to an external part, does not an orientation, so the PC receptacle is subject to a rotational alignment with an axis $\Phi$ in consideration of uncertainty of the direction of beam path, thereby achieving the maximum optical coupling.

In order to achieve the maximum optical coupling by use of the APC receptacle TOSA, a facet direction of the APC receptacle needs to be fixed to a predetermined direction of an external optical connector. Accordingly, a fiber receiving end, which is provided at a lower part of the APC receptacle, needs to be aligned at a predetermined position and a predetermined direction to achieve the maximum optical coupling. However, both of the angle and the direction of the APC receptacle are limited, resulting in complication and difficulty in manufacturing an APC receptacle TOSA compared to the PC receptacle TOSA.

SUMMARY

The following description relates to an APC receptacle stub enabling easy optical alignment and an APC TOSA having the same.

In one general aspect, there is provided an Angled Physical Contact (APC) receptacle stub accommodated in a transmitter Optical Sub-Assembly (TOSA), the APC receptacle stub including: a first APC stub which has an optical fiber inserted thereto and is provided with one end section polished in an APC shape; and a second APC stub which has an optical fiber inserted thereto and is provided with one end section polished in an APC shape and an opposite end section which is coupled to an opposite end section of the first APC stub through rotation adjustment in the same axial direction as an axial direction of the opposite end section of the first APC stub.

In another general aspect, there is provided an Angled Physical Contact (APC) transmitter Optical Sub-Assembly (TOSA), the APC TOSA including: a receptacle; an APC receptacle stub configured to be accommodated in the receptacle, the APC receptacle stub comprising a first APC stub, which has an optical fiber inserted thereto and is provided with one end section polished in an APC shape, and a second APC stub, which has an optical fiber inserted thereto and is provided with one end section polished in an APC shape and an opposite end section which is coupled to an opposite end of the first APC stub through rotation adjustment in the same axial direction as an axial direction of the opposite end of the first APC stub; a housing configured to have one side opening to which the receptacle is coupled; and an optical transmitter module configured to be coupled to an opposite side opening of the housing and have a light source chip that performs optical coupling with the APC receptacle stub.

As described above, this example can provides an optical alignment using a APC receptacle with a level of difficulty corresponding to when a PC receptacle is used, and, and can be widely applied even to light sources sensitive to reflection, thereby reducing the packaging cost.

In addition, an optical transceiver using the example of the APC receptacle TOSA provides a shape of an optical transceiver capable of satisfying the MSA standard while reducing the cost for packaging a reflection sensitive light source. As a result, the mounting density of a system is increased and the mechanical complexity is reduced, thereby reducing the implementation cost of the system.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, examples will be described with reference to accompanying drawings in detail.

Figure 1:
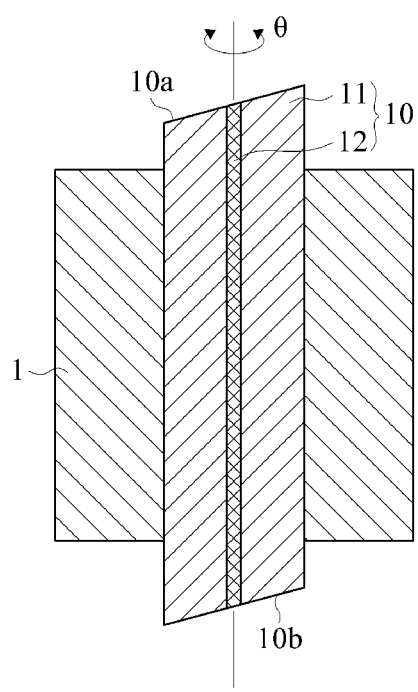
FIG. 1 is a sectional view showing a conventional APC receptacle stub.

As shown in FIG. 1, a conventional APC receptacle stub 10 is accommodated in a receptacle 1. The APC receptacle stub 10 includes a stub 11 and a through hole which an optical fiber 12 is inserted into and fixed in. One end 10a and an opposite end 10b of the APC receptacle stub 10 are polished in an Angled Physical Contact (APC) shape. The one end 10a of the APC receptacle stub 10 may serve as a transmitting end disposed outside of a transmitter Optical Sub-Assembly (TOSA), and the opposite end 10b of the APC receptacle stub 10 may serve as a receiving end disposed inside of the TOSA.

The transmitting end 10a of the APC receptacle stub 10 has a coincidence in an APC direction with the receiving end 10b of the APC receptacle stub 10. That is, if the APC direction of the transmitted end 10a is changed in a $\ominus$ axis direction of, the APC direction of the receiving end 10b is also changed in the $\ominus$ axis direction. Since the direction of the transmitting end 10a is fixed to a predetermined direction of an external optical connector, an maximum optical alignment is achieved only when the receiving end 10b is fixed at a predetermined position and direction. Accordingly, the alignment time is increased and the complicated process including the precise control of process conditions and the mechanical compensation is required. In addition, in order to compensate for the uncertainty occurring during a laser welding process, the process conditions need to be strictly kept and the optical elements need to meet particular requirements.

In order to resolve the above drawbacks, an example of an Angled Physical Contact (APC) receptacle stub 100 is configured to implement an alignment scheme in which the requirement of alignment direction is lessen among requirements of an alignment direction and an alignment position that are required to align an APC TOSA in general.

Figure 2:
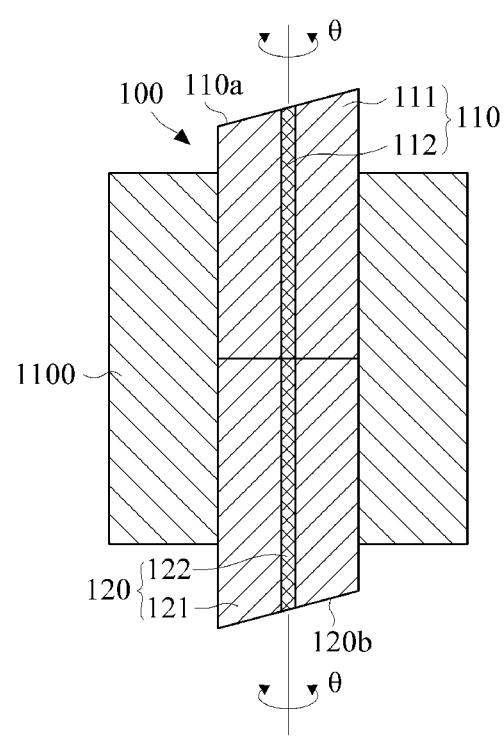
FIG. 2 is a sectional view showing an example of an APC receptacle.
Figure 3:
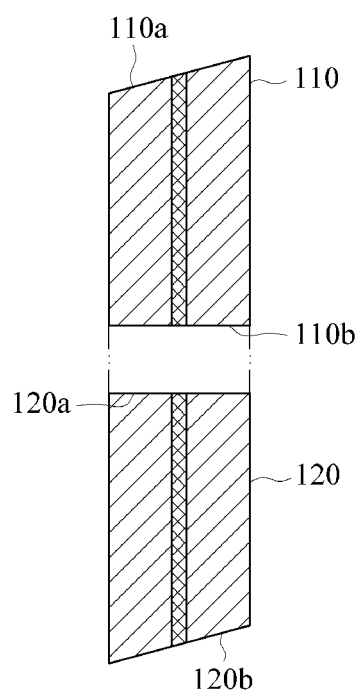
FIG. 3 is a sectional view showing an example of the APC receptacle of FIG. 2 which is separated into a first APC stub and a second APC stub.

FIG. 2 is a sectional view showing an example of an APC receptacle, and FIG. 3 is a sectional view showing an example of the APC receptacle of FIG. 2 which is separated into a first APC stub and a second APC stub.

As shown in FIGS. 2 and 3, the APC receptacle stub 100 includes a first APC stub 110 and a second APC stub 120 that are accommodated in a receptacle 1100 (which may also be referred to as a holding receptacle). The first APC stub 110 includes a stub 111 and a through hole which an optical fiber 112 is inserted into and fixed in. The second APC stub 120 includes a stub 121 and a through hole which an optical fiber 122 is inserted into and fixed in.

An upper end 110a of the first APC stub 110 is polished in an APC shape, and a lower end 110 of the first APC stub 110 is coupled to an upper end 120a of the second APC stub 120. The upper end 120a of the second APC stub 120 is coupled to the lower end 110b of the first APC stub 110 and a lower end 120b of the second APC stub 120 is polished in an APC shape.

The upper end 110a of the first APC receptacle 110 may serve as a transmitting end disposed outside of a transmitter Optical Sub-Assembly (TOSA), and the lower end 120b of the second APC receptacle stub 120 may serve as a receiving end disposed inside of the TOSA. The upper end 120a of the second APC stub 120 is coupled to the lower end 110b of the first APC stub 110 through rotation adjustment in the same axial direction as the axial direction of the lower end 110b of the first APC stub 110. Accordingly, the APC direction of the receiving end of the APC receptacle stub 100 may be adjusted regardless of the direction of the transmitting end.

That is, after the second APC stub 120 is rotated in the $\ominus$ axis direction to adjust the APC direction of the receiving end 120b such that the optical alignment with respect to a light source chip is maximally achieved, the first APC stub 110 is rotated in the $\ominus$ axis direction to align the transmitting end 110a in a predetermined direction with respect to an external optical connector. Accordingly, the direction of incident light is not limited, and a beam, which is aligned in a predetermine position, is easily aligned in a random direction.

The first APC stub 110 is coupled to the second stub 120 through PC-PC coupling regardless of the change in the $\ominus$ axis direction. That is, the lower end 110b of the first APC stub 110 is polished in a Physical Contact (PC) shape and the upper end of the 120a of the second APC stub 120 is polished in a PC shape. Accordingly, the reflectivity at the PC-PC coupling has a significantly low value that does not cause a change in characteristics of the light source. The APC receptacle stub 100 has reflection characteristics in the optical path that is substantially similar to that of a conventional APC receptacle stub 10 and suited to be applied to a light source that is sensitive to reflection.

For reflection characteristics, the PC-PC coupling provides a reflection characteristic of about −40 dB to −50 dB or above that can satisfy the requirement for reflection in a reflection sensitive light source. In addition, the PC-PC coupling provides a low reflection loss of 0.1 dB to 0.2 dB of below. In order to improve the reflection characteristics, the lower end 110b of the first APC stub 110 and the upper end 120a of the second APC stub 120 are polished in an Ultra Physical Contact (UPC).

The PC-PC coupling requires one time process in manufacturing the APC transmitter OSA. For example, the first APC stub 110 may be coupled to the second ACP stub 120 through a compression. For example, the first APC stub 110 may be coupled to the second APC stub 120 through index matching material. Accordingly, the first APC stub 110 is stably coupled to the second APC stub 120.

The example of the APC receptacle stub 100 has a level of difficulty in optical alignment corresponding to that of a PC receptacle stub. In addition, the example of the APC receptacle stub 100 provides optical connection through coupling with an optical connector without degrading the characteristics of a light source in conjunction with reflection.

Accordingly, the APC receptacle stub 100 is applicable to a light source, such as a RSOA or an REAM, which is sensitivity to reflection characteristics. In addition, the APC receptacle stub 100 is applicable to an MSA-standardized optical transceiver and may be implemented as an LC-standardized APC receptacle stub.

Figure 4:
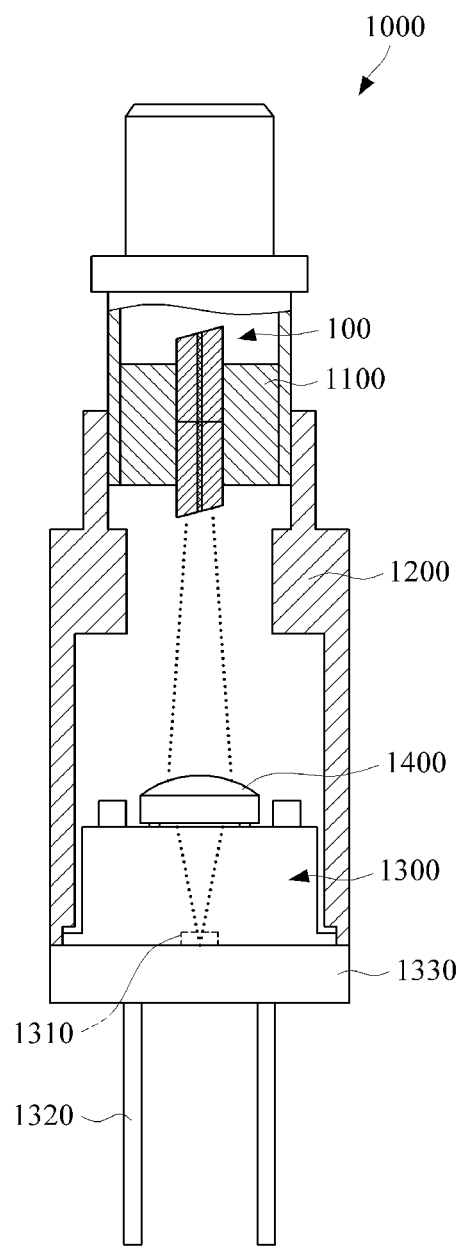
FIG. 4 is a sectional view showing an APC TOSA including the APC receptacle stub of FIG. 2.

FIG. 4 is a sectional view showing an APC TOSA including the APC receptacle stub of FIG. 2.

As shown in FIG. 4, an APC TOSA 1000 further includes a housing 1200 and an optical transmitter module 1300 in addition to the APC receptacle stub 100 and the receptacle 1100.

The housing 1200 has an inner space and two openings formed at opposite sides thereof. The receptacle 1100 is coupled to one of the openings of the housing 1200, and the optical transmitter module 1300 is coupled to the other of the openings of the housing 1200. The optical transmitter module 1300 is mounted with a light source chip 1310 that is subject to optical coupling with the APC receptacle stub 100. The housing 1200 may include a lens 1400 that is configured to perform optical alignment between the APC receptacle stub 100 and the light source chip 1310. The optical transmitter module 1300 includes a TO stem 1330 which is provided at one side thereof with the light source chip 1310 and at opposite side thereof with a lead terminal 1320.

Although an exemplary embodiment of the present invention has been described for illustrative purposes, those skilled in the art will appreciate that various modifications, additions and substitutions are possible, without departing from the scope and spirit of the invention as disclosed in the accompanying claims

What is claimed is:

1. An Angled Physical Contact (APC) receptacle stub accommodated in a transmitter Optical Sub-Assembly (TOSA), the APC receptacle stub comprising:

a first APC stub having an optical fiber inserted thereto, the first APC stub having
  one end section polished in an APC shape, and
  an opposite end section; and
a second APC stub which has an optical fiber inserted thereto, the second APC stub being rotatable relative to the first APC stub, the second APC stub having
  one end section polished in an APC shape, and
  an opposite end section coupled to the opposite end section of the first APC stub through rotation adjustment about an axial direction that is the same as an axial direction of the opposite end section of the first APC stub.

2. The APC receptacle stub of claim 1, wherein the opposite end section of the first APC stub coupled to the second APC stub is polished in a Physical Contact (PC) shape, and
the opposite end section of the second APC stub coupled to the first APC stub is polished in a PC shape.

3. The APC receptacle stub of claim 2, wherein the opposite end section of the first APC stub polished in the PC shape is polished in a Ultra Physical Contact shape (UPC), and
the opposite end section of the second APC stub polished in the PC shape is polished in a UPC shape.

4. An Angled Physical Contact (APC) transmitter Optical Sub-Assembly (TOSA), the APC TOSA comprising:
a holding receptacle;
an APC receptacle stub configured to be accommodated in the holding receptacle, the APC receptacle stub comprising
  a first APC stub which has an optical fiber inserted thereto, the first APC stub having
    one end section polished in an APC shape, and
    an opposite end section,
  a second APC stub which has an optical fiber inserted thereto, the second APC stub being rotatable relative to the first APC stub, the second APC stub having
    one end section polished in an APC shape, and
    an opposite end section coupled to the opposite end section of the first APC stub through rotation adjustment about an axial direction that is the same as an axial direction of the opposite end section of the first APC stub;
a housing configured to have one side opening to which the holding receptacle is coupled; and
an optical transmitter module configured to be coupled to an opposite side opening of the housing, the optical transmitter module having a light source chip that performs optical coupling with the APC receptacle stub.

5. The APC TOSA of claim 4, wherein the opposite end section of the first APC stub coupled to the second APC stub is polished in a Physical Contact (PC) shape, and
the opposite end section of the second APC stub coupled to the first APC stub is polished in a PC shape.

6. The APC TOSA of claim 5, wherein the opposite end section of the first APC stub polished in the PC shape is polished in a Ultra Physical Contact (UPC) shape, and
the opposite end section of the second APC stub polished in the PC shape is polished in a UPC shape.

7. The APC TOSA of claim 4, wherein the housing includes a lens configured to perform optical alignment between the APC receptacle stub and the light source chip.

8. The APC TOSA of claim 4, wherein each of the first APC stub and the second APC stub is rotatable relative to the holding receptacle and touches the holding receptacle.

9. The APC TOSA of claim 8, wherein the opposite end section of the first APC stub directly contacts the opposite end section of the second APC stub, the first APC stub being integrally formed and the second APC stub being integrally formed.

10. The APC TOSA of claim 4, wherein the first APC stub is rotatable relative to the second APC stub.

11. The APC receptacle stub of claim 1, further comprising a receptacle that each of the first and second APC stubs are disposed within, wherein each of the first APC stub and the second APC stub is rotatable relative to the receptacle and touches the receptacle.

12. The APC receptacle stub of claim 11, wherein the opposite end section of the first APC stub directly contacts the opposite end section of the second APC stub, the first APC stub being integrally formed and the second APC stub being integrally formed.

13. The APC receptacle stub of claim 1, wherein the first APC stub is rotatable relative to the second APC stub.

* * * * *